Aug. 17, 1948.     W. J. NIGHTINGALE     2,447,424
BORING APPARATUS
Filed July 8, 1944                4 Sheets-Sheet 1
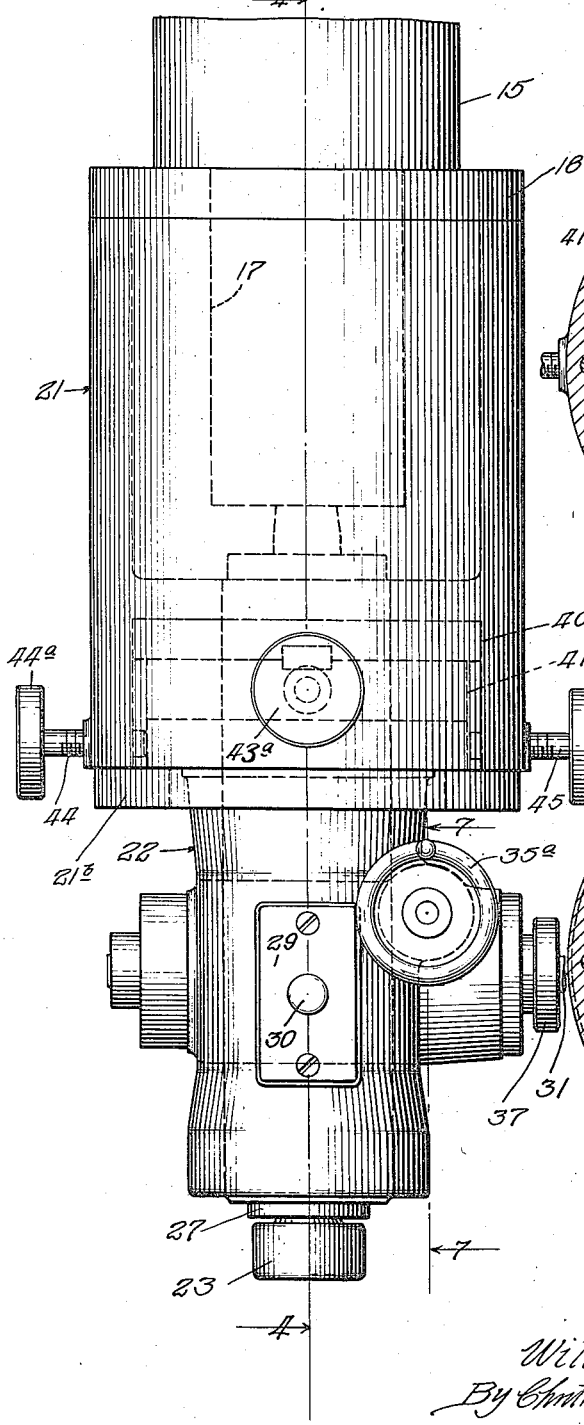
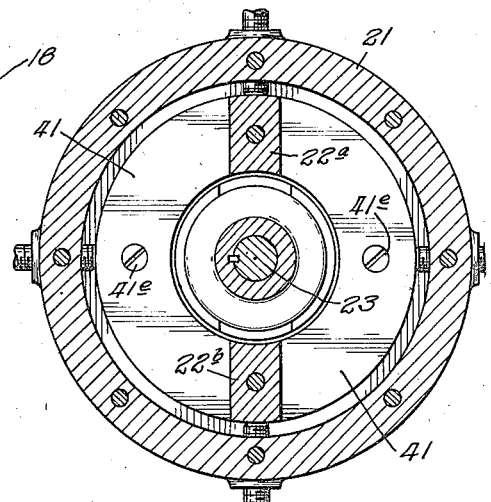
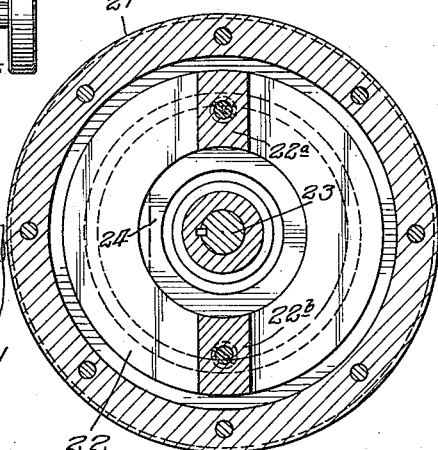
Inventor:
William J. Nightingale,
By Chritton, Wiles, Schroeder & Merriam,
Attys.

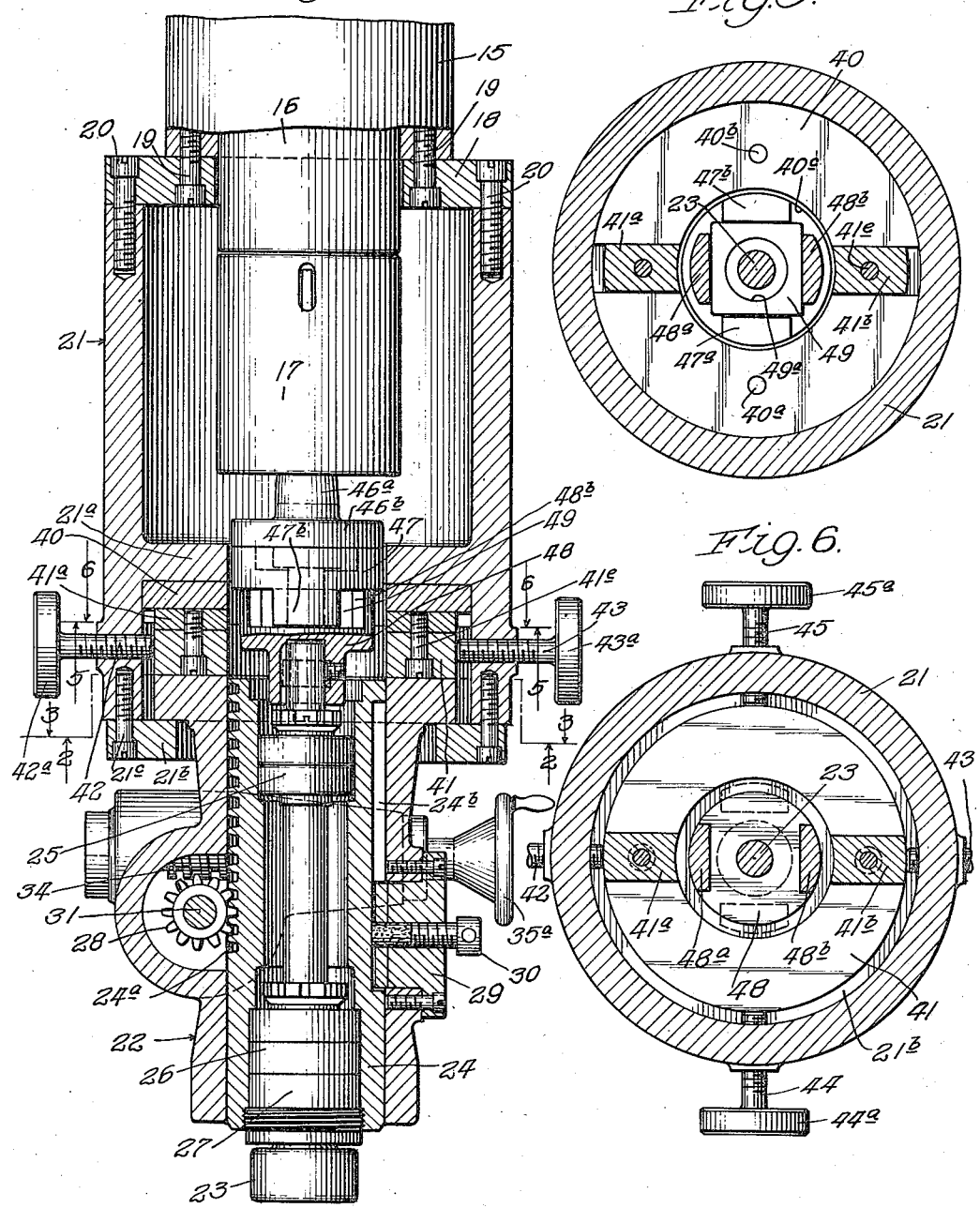

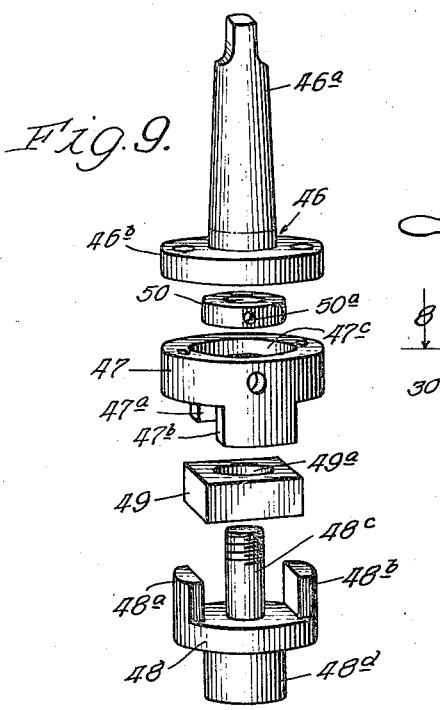
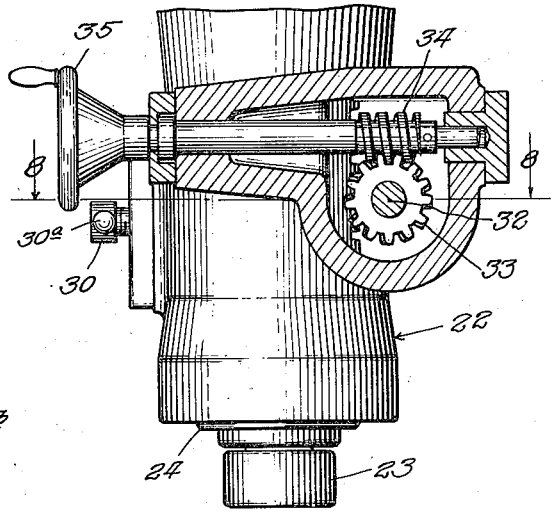
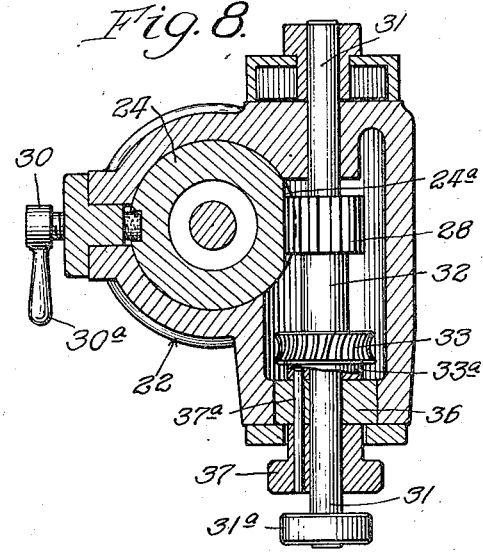
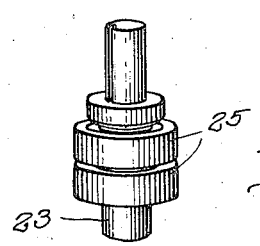

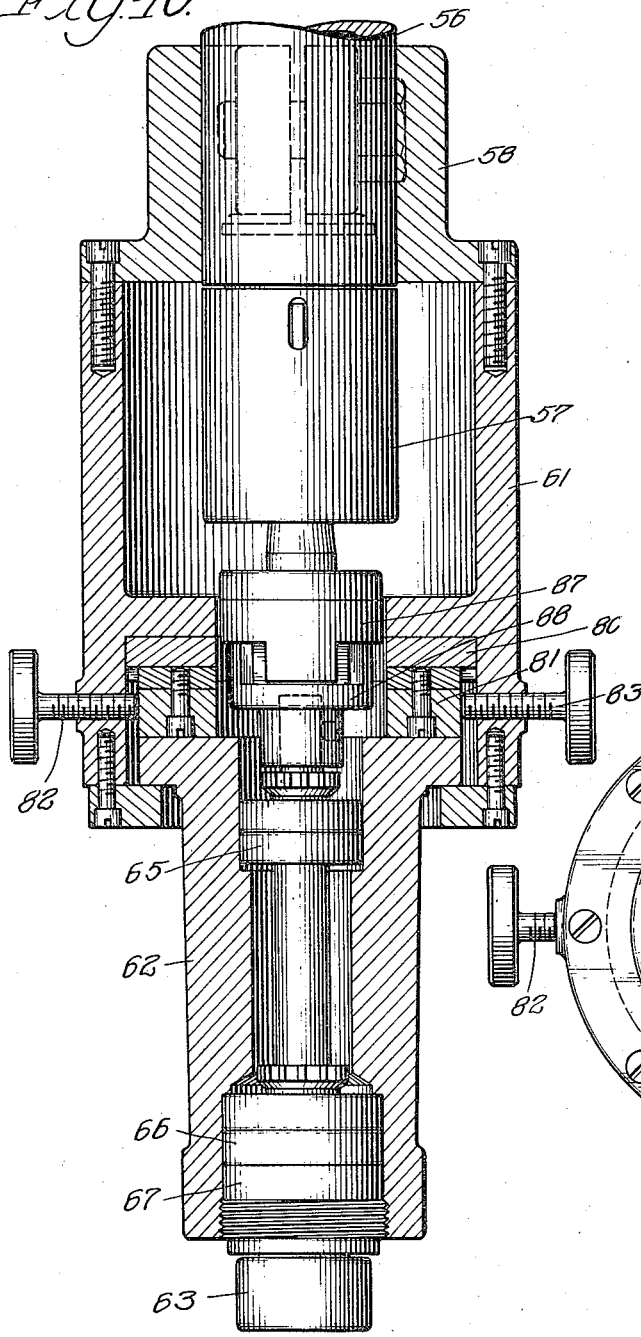
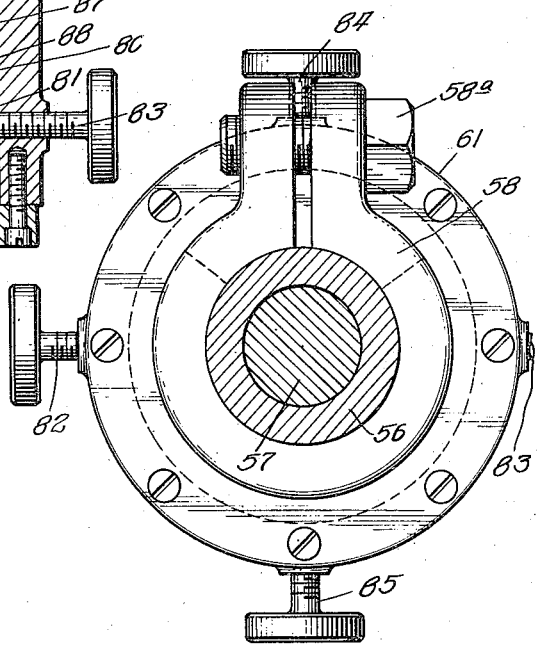

Patented Aug. 17, 1948

2,447,424

UNITED STATES PATENT OFFICE 2,447,424

BORING APPARATUS

William J. Nightingale, Oak Park, Ill., assignor, by mesne assignments, of one-half to Sophie E. Bruen, Chicago, Ill.

Application July 8, 1944, Serial No. 543,996

4 Claims. (Cl. 77—55)

This invention relates to boring apparatus, and more particularly to an attachment for a production machine tool designed for high precision boring and drilling in particular, although it is also capable of other machining operations.

One feature of my invention is the provision of improved means for quickly, easily and accurately locating a tool in a predetermined position relative to a work piece; another feature of this invention is that the tool may be quickly and easily moved, within certain limits, in either or both of two different directions at right angles to each other and to the axis of rotation of the tool, in such manner that the tool may be precisely located at a desired predetermined point on the work piece; still another feature is the provision of a connecting means in the tool driving arrangement for maintaining operative driving connection despite displacement of the axis of rotation of the tool relative to the driving axis; yet another feature of this invention is that it incorporates an improved universal coupling of the so-called "wobble block" type so constructed and arranged that the parts of the coupling are held together without the need of external means for that purpose, while the desired relative freedom of movement between the parts is retained; a further feature of this invention is that apparatus embodying the improvements which are the subject matter of this application is particularly designed for and adapted to be used as an attachment to a conventional production machine tool, as a drill press, for example; still a further feature of my attachment is that it can be built in such manner as to enable high precision work at a low price; and yet a further feature of this invention is that an attachment embodying my invention enables drilling, boring and other machining, for making tools, jigs, and the like, to be done on a drill press or other production machine tool with an accuracy equivalent to that possible on an expensive jig boring machine, economically out of the question for the ordinary machine shop. Other features and advantages of this invention will be apparent from the following specification and the drawings, in which:

Figure 1 is a front elevational view of one form of apparatus embodying my invention; Figure 2 is a transverse horizontal sectional view along the line 2—2 of Figure 4; Figure 3 is a transverse horizontal sectional view along the line 3—3 of Figure 4, along the same line but looking in the opposite direction from Figure 2; Figure 4 is a view, principally in vertical section, along the line 4—4 of Figure 1; Figure 5 is a transverse horizontal sectional view along the line 5—5 of Figure 4; Figure 6 is a transverse horizontal sectional view along the line 6—6 of Figure 4, along the same line but looking in the opposite direction from Figure 5; Figure 7 is a fragmentary view, partly in section, along the line 7—7 of Figure 1; Figure 8 is a sectional view along the line 8—8 of Figure 7; Figure 9 is an exploded view, in perspective, of certain parts shown in operative relationship in Figure 4, the parts being spread apart to enable clearer understanding of their relationship; Figure 10 is a vertical sectional view of another form of apparatus embodying my invention; and Figure 11 is a transverse horizontal sectional view along the line 11—11 of Figure 10.

A large and well-equipped tool room is usually provided with a jig boring machine for doing high precision machining work, particularly boring, on tools, dies, jigs, and similar work pieces requiring high precision. A good jig boring machine is a fine example of the machine tool maker's art, providing tool location and operation with a very high degree of precision; but such a machine is large, heavy and expensive, costing many thousands of dollars. Even the best shops and tool rooms can seldom afford but one such machine, and the shop or tool room of small or even moderate size is economically unable to have a jig boring machine of this type, despite its many advantages in tool making.

I have developed and am here disclosing and claiming an attachment particularly intended for precision boring and designed to be used on a production machine tool, a drill press being one example of a machine tool with which it is adapted to be associated. The attachment makes use of the frame, work supporting means, tool driving means, and the like, of the conventional machine; but it provides a tool holding and rotating element which is precision made and precision journaled in a supporting arrangement capable of traversing movement in a plane at right angles to the axis of rotation of the tool. No matter how sloppy and worn the quill and spindle of a drill press may have become, the other parts of the machine tool provide the necessary operative driving and supporting means for the attachment and work piece without introducing any inaccuracies. My attachment, of course, would be used only for precision work, so that its parts would retain their accuracy over long periods.

Moreover, even if a conventional drill press is brand new and of a good make, so that its spindle and quill have no play or inaccuracies, my attachment provides a very considerable improvement in the making of tools, dies, jigs and the like. A jig boring machine has a precision made platen and saddle arrangement for supporting a work piece and moving it into a precisely predetermined relationship with the tool with a high degree of accuracy; a drill press is customarily provided only with a fixed work supporting surface adapted to have the work piece clamped thereon in the desired position relative to the tool. In practice, clamping a work piece precisely in a predetermined relationship to a boring tool or other tool in a drill press is almost impossible. No matter how carefully the work piece is initially lined up in proper position, tightening the clamps throws it slightly out of place— it is to be remembered that the precision needed in good tool making is measured in tenths of thousandths of an inch. Where jig holes or other holes are being bored on a good drill press today in a small shop, it is customary to locate the work piece, partly tighten the clamps, relocate the work piece, further tighten the clamps, still further relocate the work piece, this time generally by tapping with a mallet, and finally to completely tighten down the clamps. Even after all of this long and laborious work, it will generally be found that the work piece is a thousandth of an inch or more out of position, and the clamps will have to be slightly loosened and the job done over. All of this is time consuming and laborious; and in the end the workman may compromise somewhat with precision in order to get the job done.

My attachment not only has its tool holding and rotating element so made and mounted as to operate with a high degree of precision, but also provides means for laterally traversing the tool, displacing the axis thereof in a plane perpendicular to the axis of rotation. While apparatus embodying this invention would generally be made with only a limited amount of such traversing movement (as 1/8 inch in each direction from center position), the traversing of the tool axis is sufficient to enable the highest accuracy of work to be done quickly and easily. With the use of my attachment, it is only necessary to locate the work piece in a position very closely approximating the desired relative position with respect to the axis of rotation of the tool, and then immediately to clamp it down firmly. Even if the work piece was originally not located any closer than a few hundredths of an inch, and if further cumulative error is introduced by a few more hundredths of an inch of movement when the work piece is clamped down, this is still well within the range of traversing movement of the tool. The workman need only operate the tool traversing means in the attachment head, without touching the work piece or clamps, to bring the tool over into the desired predetermined relationship with the work piece with the highest degree of accuracy. The traversing controls in the attachment head are capable of very convenient operation by the workman, and enable the hole to be located with the precision accuracy of a jig boring machine.

The attachment head forming the subject matter of this invention incorporates in some part improvements which I have heretofore made in machine tools, and more particularly in the apparatus forming the subject matter of my copending application Serial No. 537,999, filed May 30, 1944. As to the principles and improvements which are common to the apparatus shown in this application and the apparatus shown in my above mentioned copending application, the broad or generic claims are in such earlier filed application, and the species claims to the apparatus shown here are in the present application; although it will be understood that this application also includes claims to certain improvements and inventions not having any basic or generic relation to the disclosure in the above-mentioned application.

In the particular embodiment of my invention illustrated in Figures 1–9, inclusive, only a very small portion of a drill press, representative of a machine tool to which my head may be attached, is illustrated in the drawings, as such a press is conventional and well known in the art. The drill press parts illustrated comprise a quill housing 15, a quill 16 longitudinally movable in such housing, and a spindle 17 rotatably journaled in the quill in accordance with conventional practice, the tool-receiving portion of the spindle being best seen in Figure 4. The attachment embodying my invention is in this case mounted on the quill housing 15 of the drill press, this mounting being shown as effected by attaching a plate 18 to the quill housing 15 by studs 19, the plate in turn being attached, by studs 20, to the side walls of an upper housing portion, here identified in general as 21, of my attachment.

The attachment structure now being described comprises two principal parts, the upper housing 21 just mentioned and a lower housing 22 which has limited traversing movement with respect to the upper housing, and which serves to carry the traversing drive arrangements, the tool holding and rotating element, and part of the driving connection therefor. The tool holding and rotating element, literally speaking, is the spindle 23 adapted to hold and rotate the tool to be used, as a borer, a twist drill, or the like. The spindle is mounted in a quill or cylindrical member 24 longitudinally movable (i. e., movable along the axis of rotation of the spindle) in the lower or quill housing 22. These parts would, of course, be made with a high degree of precision; yet a cylindrical quill can be precision fitted in its quill housing, and a spindle precision fitted in the quill, without expensive manufacturing procedures, since all of the cooperating surfaces are cylindrical and can be precision finished with relative cheapness by grinding.

Referring now more particularly to Figure 4, it will be seen that the spindle is rotatably journaled in the quill in upper and lower ball bearings here identified as 25 and 26, the bearings being shown as pre-loaded, to ensure the greatest accuracy in rotation of the spindle within the quill, by a threaded member 27. The cylindrical quill is provided on one side with a rack portion here identified as 24a, the rack teeth being adapted to mesh with the teeth of a pinion gear 28 to provide a quill drive which will be further described; and the quill is provided on the other side with a longitudinal slot 24b. A plate 29, removably attached to one side of the housing 22, has an inner end portion lying in this slot and serving to keep the quill within the housing after assembly. This plate has threaded therein a locking device 30 provided with a handle, which can be used to lock the quill in a desired position for certain machining operations, as milling. During drilling or boring, of course, the device 30 would be loosened to permit longitudinal movement of the quill.

The quill drives, comprising both a fast and a slow drive, are best illustrated in Figures 7 and 8 and will now be described. A pinion 28 is rigidly mounted on a shaft 31 rotatably journaled in a portion of the lower housing 22. Rotatably journaled on the shaft 31 is a sleeve 32 having a worm gear 33 rigidly mounted thereon, this gear being in mesh with a worm 34 adapted to be manually rotated by the handwheel 35a to provide a slow speed drive for the quill when the gear 33 is connected to the pinion 28. Directly mounted on one end of the shaft 31 is a knob 31a adapted to directly rotate the pinion 28 to provide the high speed drive for the quill.

Clutching and unclutching for rendering the slow speed or worm drive effective or ineffective is provided by parts including an annular member 36 rigidly mounted on the shaft 31 and rotatably mounted in the housing; and a shiftable member 37 axially movable along the shaft 31. A pin 31a rigidly mounted in the shiftable member 37 is reciprocal in an opening in the member 36, and is adapted to have its inner end received in an opening in the hub 33a of the worm gear. When the member 37 is in the position shown in Figure 8, the pin provides a driving connection between the member 36 (rigidly mounted on the shaft 31) and the worm gear 33, so that rotation of the handwheel 35a effects rotation of the pinion 28 and desired feeding movement of the quill 24. On the other hand, if the member 37 is pulled down (speaking with respect to the position of the parts as shown in Figure 8) far enough to withdraw the pin 37a from the hole in the hub 33a, driving connection between the worm gear and the pinion is disconnected and quill feed may be effected by direct operation of the knob 31a.

The arrangement just described, as will be readily apparent, provides tool holding and rotating means which is capable of axial movement for boring or drilling, for example, and which can be and is manufactured as a precision machine tool, the spindle being carefully journaled in the quill with preloaded bearings so that the axis is carefully maintained, and the quill being a precision fit in the quill housing for the desired longitudinal movement. The remaining problem for a precision boring or drilling job, then, is that of precisely locating the axis of rotation of the tool (i. e., the axis of the spindle) with the work piece. As has been previously mentioned, this is accomplished by providing a mounting and drive means for traversing the whole lower end assembly just described in a plane perpendicular to the axis of rotation of the spindle.

In general, this comprises a mounting for the lower housing 22 permitting its movement in any direction in such plane through at least a limited range of movement, ⅛ inch in each direction from the center in the case of one embodiment of this invention which I have constructed; drive means for effecting precision traversing of the housing 22 in either of two directions at right angles to each other, and for holding it in the position to which it may have been moved; and a driving arrangement for the spindle including a universal coupling maintaining the driving relationship while enabling the desired traversing movement or relative displacement of the axes.

Referring now more particularly to Figures 2–6 and 9, this movable mounting, traversing drive and spindle driving arrangement will be described. The upper housing 21 is provided intermediate its ends with a horizontal partition portion 21a having a central opening of substantial size to accommodate part of the universal coupling which will be subsequently described. This entire upper casting, including the partition portion 21a, is merely a common casting of soft metal, and to provide a good bearing surface of hardened metal, a disk member 40 is bolted to the underside of the horizontal partition portion 21a, studs for this purpose (not shown) passing through the openings 40a and 40b. The disk member is provided with a central circular opening of substantial size here identified as 40c, this opening being designed to receive certain parts of the universal coupling, shown exploded and immediately above the disk member 40 in Figure 9 and in operative relation in Figure 4. This disk member is also provided, on its lower surface, with a transverse slot here identified as 40d.

Immediately below this disk member 40 is another hardened steel disk member here identified as 41. This is provided with an upper slot coinciding with the lower slot 40d, a pair of hardened steel keys 41a and 41b being fastened therein and projecting above the upper surface to be received by and be movable in the slot 40d of the other disk member. While these are here shown as separate keys held by studs 41e (see Figure 4), it will be understood that this is merely for convenience in manufacture and that the piece 41 could be manufactured out of a single piece of metal if desired. The disk member 41 is also provided with a central opening 41c of substantial size, and with a lower diametrically extending slot 41d at right angles to the upper slot in this piece. The upper annular surface of the member 41 is adapted to bear against the lower annular surface of the member 40, the interaction between the keys 41a and 41b and the diametrically extending slot 40d enabling relative motion between these parts only along the central line of the slot 40d, it being understood that these parts would be precision made and that there would be a very close fit between the keys and the side walls of the slot.

The upper end of the lower housing 22 is formed into a hardened disk-like portion adapted to bear the same relation to the disk member 41 that it in turn bears to the disk member 40. That is, the disk portion at the top of the lower housing is provided with a pair of keys 22a and 22b adapted to be a close sliding fit in the slot 41d, and the center of this portion is provided with an opening 22c of sufficient size to permit freedom of movement of the lower coupling member.

As may be best seen in Figure 4, these parts are all adapted to be in close sliding relationship with each other. In the particular construction illustrated for this first form of my invention an annular ring member 21b is bolted to the lower end of the walls of the upper housing 21 by studs here identified as 21c. The upper surface of this ring member bears against the lower surface of the upper or disk portion at the top of the lower housing 22, and holds this against the disk member 41 and the disk member 41 in turn against the disk member 40. It will be apparent, from an inspection of Figure 4, that there is sufficient clearance between these parts and the side walls of the upper housing 21 to enable limited movement of the lower housing 22 in any direction.

Traversing movement of the lower housing 22, and locking of it in a desired operative position, are effected by two sets of traversing drive means. One of these drive arrangements comprises the studs 42 and 43 terminating in knobs 42a and 43a for manual manipulation, the threaded portions of these studs being received by correspondingly threaded openings in the side walls of the upper housing 21. The inner ends of the studs 42 and 43 bear against diametrically opposite edges of the disk member 41; and, since the studs are diametrically opposite each other, and in a line coinciding with that of the slot 40d, manipulation of the knobs 42a and 43a effects traversing movement of the member 41 (and thus also of the entire lower housing and parts associated therewith) in a direction from right to left or vice versa, speaking with respect to the position of the parts as shown in Figure 6. It will be understood that both hands are used and that as one stud is screwed in the other is correspondingly backed out to effect this traversing movement; and that, when the proper position in that direction of motion has been secured, the parts are tightly locked in desired position merely by tightening up on both knobs similarly. A traversing drive for moving the housing 22 in a direction at right angles to that just described is provided by the studs 44 and 45, these studs being similarly provided with knobs 44a and 45a and being in a somewhat lower plane than the studs 42 and 43. That is, the studs 44 and 45 are threaded into diametrically opposite openings in the side walls of the upper housing 21 at a level such that their inner ends bear against the edges of the disk portion at the upper end of the housing 22. These latter traversing means are arranged in line with the slot 41d, so that manipulation of the knobs 44a and 45a effects traversing movement of the housing 22 along the line of this slot, which is at right angles to the slot 40d. It will thus be seen that, through a combination of these two traversing manual drive arrangements, the lower housing 22, and the spindle and quill carried thereby, can be moved to any desired position within the range of movement provided; and that they can be locked in such position for operation.

In order to provide a driving connection between the spindle 17 and the spindle 23 during such traversing movement, I provide a universal coupling of the type sometimes known as the "wobble plate" type, although somewhat modified better to serve my purpose. Referring now more particularly to Figures 5, 6 and 9, it will be seen that the upper member of the coupling, here identified as 46, includes an upwardly extending shank 46a adapted to be received in and rotated by the drill press spindle 17; and a lower disk portion 46b. This latter portion is adapted to be bolted or otherwise fastened to one of a pair of yoke members 47 and 48, these yoke members having arm portions adapted to cooperate with an intermediate rectangular block member here identified as 49. Referring more particularly to Figures 5 and 9, it will be seen that the upper yoke member 47 has a pair of downwardly extending arms 47a and 47b closely but slidably embracing one pair of opposite sides of the block member 49; and that the yoke member 48 has a pair of upwardly extending arm portions 48a and 48b closely but slidably embracing the other pair of opposite sides of the block member 49. The lower yoke member 48 is provided in its center with an upwardly extending stud member 48c adapted to pass through an opening 49a in the center of the block member and a corresponding central opening in the yoke member 47, and to have a circular nut 50 threaded on the upper part thereof and locked in position by a lock screw 50a. The upper surface of the yoke member 47 is recessed to provide a cavity here identified as 47c, and the clearance between the walls of this cavity and the sides of the circular nut 50 is at least equal to the desired range of movement of the lower housing. The central openings in the yoke member 47 and the block member 49 are also of a diameter substantially larger than the diameter of the stud portion 48c, so that there is at least as much clearance between the studs and the side walls of these openings as the desired range of movement of the lower housing. Similarly, the clearance between the lower coupling member and the walls of the openings in the partition and the disk members is sufficient to provide clearance for the desired range of movement.

When the parts are in operative relationship, as shown in Figures 4, 5 and 6, the shank 46a is received in and rotated by the spindle 17 of the drill press when the drill press drive is operative. This effects rotation of the yoke member 47, and, through the cooperation between its arms and two sides of the block member 49, rotation of the block member which in turn, through cooperation of its other pair of sides with the arms of yoke member 48, effects rotation of the latter yoke member. This in turn rotatably drives the spindle 23, the upper end of the spindle being splined in an opening provided for that purpose in the cylindrical depending portion 48d of the yoke member 48, as may be best seen in Figure 4, and held in place by a lock screw 48d. Traversing of the lower housing 22 in either of its two directions of motion merely effects slidable movement between one pair of yoke arms and the cooperating sides of the block member, without in any way destroying the desired drive relationship between the shank 46a (always having its axis of rotation maintained fixed) and the spindle 23 (having its axis of rotation displaced through the range permitted). When the axis of the spindle 23 coincides with that of the spindle 17 the coupling parts are in the relations shown in Figures 5 and 6. Manipulation of the knobs 42a and 43a, and the traversing movement effected thereby, would merely initially displace the block to one side within the yoke arms 47a and 47b; and, upon traversing rotation of the parts, the block would slide back and forth within these arms to an extent necessitated by the amount of traversing movement which had been effected. Similarly, traversing movement in the other direction would result in sliding action between the yoke arms 48a and 48b during operation of the attachment. In each case, however, the axis of the spindle 23 may be displaced with respect to that of the spindle 17 without disturbing the driving relationship, and this driving relationship is effected through a very simple and convenient universal coupling.

In order to hold the parts of the coupling together in the desired operative relation without the need of an external housing embracing the parts, I have provided an improvement in the form of the central stud 48c and the nut 50. The lower surface of the nut 50 bears against the bottom of the recess 47c, when it is operative to hold the parts of the coupling together, but is slidable thereon during relative movement between the yoke members. This sliding permits the desired lateral displacement of the parts, but the presence of the nut and stud prevents the yoke member 48 and block 49 from dropping out of proper relationship with the yoke member 47. This is of particular importance in the construction which I employ, since it enables me to provide sufficient clearance around the yoke member to have the desired movement of the lower housing and the parts carried thereby.

In this form of my invention the conventional spring or weight balancing associated with the drill press quill is preferably disconnected so that the drill press quill and spindle, by virtue of their weight, always bear down upon the quill in the attachment, as this removes any necessity of holding action by the nut 50 during drilling or boring operations. It will be understood, of course, that the quill drive in the drill press is disconnected and the drill press quill and spindle, the coupling, and the attachment quill and spindle all move vertically as a unit upon operation of either of the quill drives in the attachment, sufficient clearance being provided, as illustrated, for an appropriate range of vertical movement, as three inches.

Referring now more particularly to Figures 10 and 11, another form of attachment embodying my invention will be described. In this case there is again an upper housing 61 and a lower housing 62 providing supporting means for a spindle 63. In this embodiment of my invention no quill or quill drive is provided, the spindle 63 being mounted directly in the housing 62 by the use of ball bearings 65 and 66 preloaded by the threaded member 67. As before, disk members here identified as 80 and 81, in cooperation with the disk portion at the top of the housing 62, provide for traversing movement in two directions at right angles to each other and in a plane at right angles to the axis of rotation of the spindle 63; and stud members 82, 83, 84 and 85 provide manual drive means for effecting such traversing and for locking the housing and spindle in the desired position. A universal coupling in the driving connection is again provided, yoke parts 87 and 88 corresponding to the previously described yoke parts 47 and 48 and cooperating similarly with an intermediate rectangular block member.

In the case of this attachment, however, the vertical movement of the tool (movement along its own axis) is not effected by movement of a spindle within the lower housing, but by vertical movement of the whole attachment. In this case it is assumed that the attachment is to be used on a machine tool, having a vertically movable member, as the quill of a drill press, which is in good condition and which will not introduce inaccuracies into the work. This is generally the case, as if a drill press has been at all reasonably taken care of, wear mostly takes place between the spindle and the quill, and inaccuracies in work generally arise there. Accordingly, in this form of my invention the upper housing 61 is not attached to the quill housing of the drill press as was the case in my first form; but is instead clamped to the quill 56 of the drill press, so that the whole attachment is vertically movable therewith. In this case the upper member 58 which is bolted to the side walls of the upper housing 61 is a split clamping member adapted to have its ends drawn together by a stud here identified as 58a to clamp this portion to the drill press quill 56. The drill press quill carries a rotatable spindle 57, and rotation of this drill press spindle by the drill press driving arrangement operates through the universal coupling to effect rotation of the spindle 63 whether or not the axes of the two spindles are aligned. In the case of this form of my invention the conventional spring or weight balancing of the drill press spindle 56 would preferably be adjusted to provide an approximate balance for the additional weight of the attachment shown here, so that vertical movement of the tool could be easily effected by the means provided for vertical movement of the drill press spindle 56.

As one representative use of my invention, the procedure for boring several holes in a jig plate will be described. The work piece, in the assumed case a plate, would first be cross marked with precision, by any conventional gauge, at the points where the holes are to be bored. The work piece would then be placed on the work supporting surface of the drill press and moved by hand into a position where the axis of the spindle 63 approximately (within a few hundredths of an inch) coincides with the center of the hole to be bored. The clamps would then be applied and tightened, without the necessity of any undue care in this operation, since even if the work shifted a few more hundredths of an inch no difficulty would be encountered. The manual traversing drives of my attachment would then be operated to bring the axis of the spindle 63 precisely in registry with the axis of the hole to be bored.

It will be understood that this locating could be accomplished in any of several conventional ways. A centering tool or drill could be mounted in the spindle, and its apex brought into exact registry with the point defined by the cross lines of the work piece, a magnifying eye glass being used in conventional manner; or a wiggler could be placed in the spindle, rotated and brought to a steady condition, then the locating and registering effected with an eye glass; or a locating telescope with cross hairs in it could be mounted in the spindle or in predetermined relation thereto and registry determined by comparing the cross hairs in the telescope with the cross lines on the work piece.

In any event, the point is initially merely to get an approximately correct location of the work piece on the supporting surface, which can be very easily and quickly done; and then to make the final precision registry of the spindle axis with the predetermined point on the work piece by traversing movement of the lower housing of the attachment. This enables this precision registry to be secured very much more easily and conveniently than has heretofore been possible with anything other than an expensive jig boring machine, and with an accuracy equivalent to that of such a machine.

When the registry of the spindle axis with the predetermined point on the work piece is effected, the locating device is removed and replaced by a twist drill. The drill press drive then provides means for rotating the twist drill, and the vertical movement provided either by the separate quill in my attachment, or by movement of the drill press quill and the whole attachment, enables the hole to be quickly and easily drilled. The drill would, of course, be of a smaller diameter than that of the hole eventually desired, in precision work; and the drill would be replaced by a boring tool and the operation repeated to provide a hole of the correct diameter, the resulting hole being as precision positioned and bored as would be possible in an expensive jig boring machine.

The operator would then bring the lower housing of the attachment back to center position by operation of the manual traversing drives, move the work piece to a new position approximately correct for a second hole, and repeat the operation to drill and bore this next hole with high precision. As will be readily apparent, any desired number of holes can be bored in the jig plate, in a relationship determined by the original cross marks and with an accuracy, in the hands of a good operator, within a tenth of a thousandth of an inch. It will also be readily apparent that my attachment may be used not only for drilling and boring, but also for milling or other machining operations.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In combination with a machine tool including a frame and a power driven rotatable tool spindle having radial bearings afforded by said frame, apparatus for performing precision machining unaffected by play attributable to wear or other causes existing between said spindle and said bearings, comprising: a stationary cylindrical housing, wherein the aforesaid spindle rotates in spaced relation to the inner wall thereof, rigidly secured to the aforesaid frame, a second housing non-rotatably mounted on the first-mentioned housing by means including right angularly disposed slidable members for universal lateral movement in a horizontal plane relatively to said first-mentioned housing, a second tool spindle journaled in said second housing, the plane of movement of said second housing being normal to the axis of rotation of said second spindle, a connection through which the second spindle is rotated by the first spindle regardless of whether or not the axes of said spindles are in alignment and adjustable means supported by the first housing for sliding said slidable members.

2. Ancillary apparatus, for attachment to a machine tool including a power driven rotatable tool spindle, for performing precision machining unaffected by play attributable to wear or other causes existing between said spindle and its bearings, comprising: a stationary cylindrical housing wherein the aforesaid spindle is receivable and rotatable in spaced relation to the inner wall thereof, means for rigidly securing said housing to a non-rotatable part of the aforesaid machine tool, a second housing having a laterally slidable connection with the first housing by interposed connecting means shiftable in planes at right angles to each other, a second tool spindle journaled in said second housing, the plane of movement of said second housing being normal to the axis of rotation of said second spindle, means for establishing a universal connection between the aforementioned spindles whereby the second spindle may be rotated by the first spindle regardless of whether or not the axes of said spindles are in alignment and adjustable means supported by the first housing for shifting said connecting means.

3. In combination with a machine tool including a frame and a power driven rotatable and reciprocable tool spindle, apparatus for performing precision machining unaffected by play attributable to wear or other causes existing between said spindle and its bearings, comprising: a stationary cylindrical housing, wherein the aforesaid spindle rotates in spaced relation to the inner wall thereof, rigidly secured to the aforesaid frame, a second housing nonrotatably mounted on said first housing for lateral movement in a plane relatively to said first housing, a quill reciprocably non-rotatably mounted in said second housing, selectively operable devices for reciprocating said quill at different speeds, a second tool spindle rotatably mounted in said quill and reciprocable with the quill, the plane of movement of said second housing being normal to the axis of rotation of said second spindle, and a universal connection including members having a laterally slidable engagement through which the second spindle is rotated by the first spindle, and whereby the first spindle is required to reciprocate with the second spindle, regardless of whether or not the axes of said spindles are in alignment.

4. Ancillary apparatus, for attachment to a machine tool including a frame and a power driven rotatable and reciprocable tool spindle, for performing precision machining unaffected by play attributable to wear or other causes existing between said spindle and its bearings, comprising: a stationary housing wherein the aforesaid spindle is receivable, rotatable and reciprocable, means for rigidly securing said housing to the frame of the machine tool, a second housing non-rotatably mounted on said first housing for lateral movement in a plane relatively to said first housing, a quill reciprocably and non-rotatably mounted in said second housing, means for reciprocating said quill, a second tool spindle rotatably mounted in said quill and reciprocable with the quill, the plane of movement of said second housing being normal to the axis of rotation of said second spindle, and means for establishing a universal connection between the aforementioned spindles whereby the second spindle may be rotated by the first mentioned spindle, and the first-mentioned spindle may be required to follow the second spindle when said quill is reciprocated, regardless of whether or not the axes of said spindles are in alignment said last means comprising a yoke carried by each of said spindles, a rectangular block having one pair of opposite sides engaged by the arm portions of one yoke and the other pair of sides engaged by the arm portion of the yoke, said block having a central aperture therethrough and one of said yokes having a stud projecting through said aperture and movably connected to the other yoke.

WILLIAM J. NIGHTINGALE.

REFERENCES CITED

The following references are of record in the file of this patent:

UNITED STATES PATENTS

| Number | Name | Date |
| --- | --- | --- |
| 472,126 | Johnson | Apr. 5, 1892 |
| 563,545 | Baush | July 7, 1896 |
| 1,097,678 | Scott | May 26, 1914 |
| 1,669,931 | Dowrie | May 15, 1923 |